Aug. 21, 1962 R. E. DENNEY 3,049,854
POWER LAWN MOWER
Filed Jan. 13, 1959

INVENTOR.
Ralph E. Denney
BY
Murray, Sackhoff & Murray
ATT'YS

United States Patent Office 3,049,854
Patented Aug. 21, 1962

3,049,854
POWER LAWN MOWER
Ralph E. Denney, Cincinnati, Ohio, assignor of two-fifths to Philip Ganson, Cincinnati, Ohio
Filed Jan. 13, 1959, Ser. No. 786,599
8 Claims. (Cl. 56—25.4)

This invention relates to power lawn mowers of the rotary type and is particularly directed to a centrifugal, air impelling device which secures for said mowers improved cutting and vegetation ejecting features.

An object of this invention is to provide a centrifugal, air impelling device for rotary power lawn mowers which will secure a maximum draft with a minimum expenditure of power.

Another object of this invention is to provide an improved draft means for a rotary power lawn mower that will maintain an efficient and effective draft for ejecting vegetation clippings from the mower whilst keeping the housing interior free of objectionable clipping deposits.

A further objection of the invention is to provide a simplified means for varying the draft pressure within a rotary power lawn mower housing so that the mower can be readily adjusted to cut all types of vegetation and effect a saving of power thereby.

With these and other objects and advantages in view, this invention consists of the several novel features of construction, arrangement and combination of parts, hereinafter fully set forth and claimed.

Figure 1:
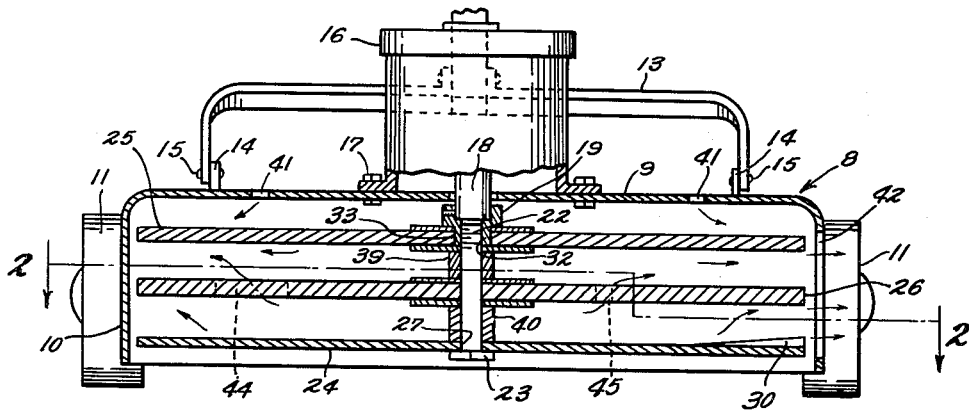
FIG. 1 is a vertical sectional view through a rotary power mower embodying the features of my invention.

Referring now more particularly ot the drawing and especially FIG. 1 thereof, the device comprises a preferably circular housing 8 having a top portion 9 and a continuous, depending skirt 10 integrally joined to the periphery of the top portion. The housing is supported for movement over the ground by a plurality of wheels 11 that are suitably located each on one of four L-shaped brackets 12 welded or otherwise secured to the exterior, diagonally opposed portions of the skirt 10. A suitable fork 13 of a mower propelling handle is pivotally mounted on the housing 8 by means of a pair of opposed lugs 14 secured to the top portion 9 and fastened by loose rivets 15 to the terminal ends of the fork.

A source of power for the mower is shown as a suitable electric motor 16 secured to the central top portion 9 of the housing by bolts 17. A vertical, driven shaft depends into the housing 10 and may comprise the electric motor shaft 18, or be operatively connected to the source of power in any suitable manner.

The end of the driven shaft 18 has an adapter 19 fixed thereto by a set screw 20 threaded in the adapter body and bearing at its inner end against the end portion of the shaft. The adapter has an internally threaded bore 21 formed concentric in its lower end to receive and cooperate with the threaded end 22 of a long bolt 23 which fixes concentrically on said drive shaft a cutter blade 24, a baffle disc 25 and an impeller disc 26 comprising the centrifugal air impelling device of this invention. The cutter blade 24 is constructed from a narrow piece of hardened steel and has a central hole 27 therein for receiving the headed end of the bolt 23. As clearly set forth in FIGS. 3 and 4, the cutter blade and the discs are continuously revolved in the direction of the arrow, said cutter blade having cutting edges 28 on its opposed leading edges whilst air deflecting wings 30 are formed on the outer trailing edge portions of the blade 24 by bending said edge portions at an angle of 15° with respect to one face of the blade before said blade is hardened.

Figure 5:
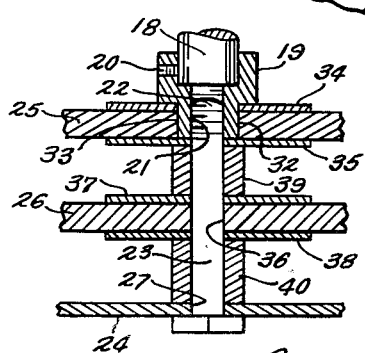
FIG. 5 is a fragmental, enlarged sectional view, like FIG. 1, showing the details of construction of the mower.

The disc 25 has a solid body portion and with particular reference to FIG. 5 it will be seen that said disc is formed with a centrally disposed hole 32 which has a diameter for snugly receiving the reduced lower end 33 of the adapter 19. Aluminum washers 34 and 35 are positioned on opposed faces of the disc 25 around the opening 32 to re-enforce the connection between the disc and the drive shaft. The disc 26 herein referred to as the air impeller disc is mounted concentrically on the drive shaft 18 intermediate the cutter blade 24 and the baffle disc 25, said air impeller disc having a central hole 36 formed therethrough for receiving the bolt 23 and having aluminum washers 37 and 38 located on opposite sides thereof around the hole 36 to re-enforce the disc and bear against spacer sleeves 39 and 40, respectively, interposed between the impeller disc and baffle disc 25 and between said impeller disc and the cutter blade 24, respectively, on the shaft 23. It will, therefore, be understood that when the long bolt 23 is threaded tightly into the tapped bore 21 in the adapter 19 that the discs 25 and 26 and the cutter blade 24 will all be fixed on the drive shaft 18 concentrically therewith and that all three of the members will be rotated in unison thereby in spaced, parallel planes normal to the axis of the drive shaft 18.

The top of the housing 9 is provided with an air pilot means which preferably takes the form of air vent openings 41 which serve to prevent the baffle disc from becoming air bound durnig rotation of the baffle disc 25. It is also highly desirable to provide the mower housing with one or more side openings 42, said opening or openings being formed in the skirt 10 of the housing and extending vertically across and beyond the planes of rotation of the cutter blade 24, the impeller disc 26 and the baffle disc 25. I have found that very good results were obtained when the baffle disc 25 was spaced approximately ¾ of an inch from the top portion 9 of the housing whilst the spacing between the baffle disc 25 and the air impeller disc 26 was approximately ⅞ of an inch; it being thought that a spacing of one inch between the cutter blade 24 and the air impeller disc 26 will give optimum cutting discharge for the mower.

Figure 2:
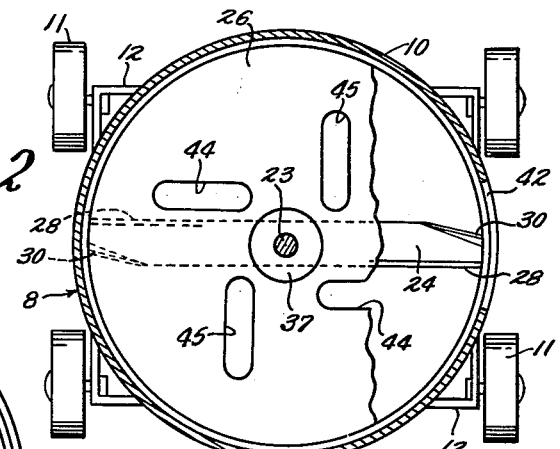
FIG. 2 is a section taken on line 2—2 of FIG. 1 on a slightly smaller scale.
Figure 3:
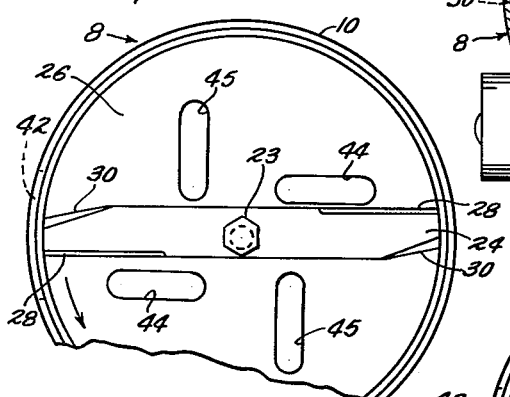
FIG. 3 is a fragmental, bottom plan view of the mower illustrated in FIG. 2 with the mower wheels removed.
Figure 4:
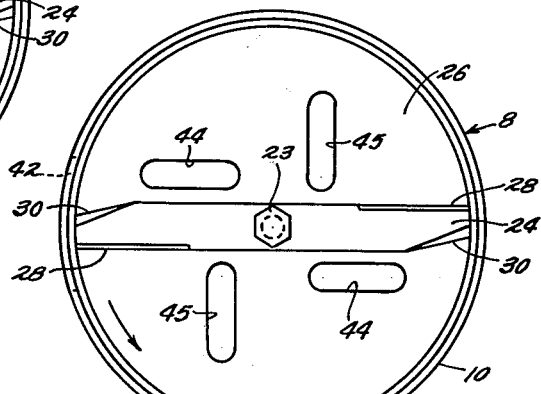
FIG. 4 is a view similar to FIG. 3 showing the mower parts in a converted position.

As best shown in FIGS. 2, 3 and 4 the air impeller disc is provided with two pairs of elongated, chordally extending slots 44—44 and 45—45. The longitudinal center lines of each pair of slots 44—44 and 45—45 are parallel to, equally spaced from, and on opposite sides of a common diameter of the air impeller disc 26; the common diameters for each of the pairs of slots being disposed at right angles to each other. As illustrated in FIG. 4 the pair of slots 44—44 trail the cuter blade 24 during rotation of the air impeller disc, the air baffle disc and the cutter and it will be noted that in such position the wings 30 of the cuter blade direct the air upwardly toward the slots 44—44 thus giving optimum air draft conditions between the blade 24 and the air impeller disc 26. With reference to FIG. 3 the relative positions of the slots and blade are shown when the air impeller disc 26 is reversed face-for-face on the drive shaft bolt 23, whereby it will be noted that the slots 44—44 lead the blade 24 during operation of the mower and that the wings will then direct air against the solid underface portion of the impeller disc 26 thereby giving minimum air draft conditions between the cutter blade 24 and the air impeller disc 26.

In the operation of my mower centrifugal force will set up a surface flow of air on all faces of the air impeller disc 26 and the air baffle disc 25 which will be directed in an outwardly direction toward the respective peripheries thereof. I have found that the centrifugal flow of air is greatest on the adjacent faces of the spaced discs and that a vacuum will be created therebetween which will pull a maximum amount of air through the slots 44—44 and 45—45 and impel such air with maximum force and volume toward the peripheries of said discs and through the discharge opening 42 in the mower housing. Also during operation the cutter blade 24 acts in the usual way to cut and sever vegetation such as grass and weeds and due to its whirling action and the updraft of air caused by the wings the cut vegetation will be thrown upwardly toward the discharge opening 42. The updraft of air created by the blade and the two discs creates a maximum updraft thereby causing the vegetation to stand up to be cut by the blade whilst the two discs carry all the cut vegetation into the discharge opening so that it cannot be deposited or build up on the interior surfaces of the housing.

Having thus described my invention, what I claim is:

1. In a power mower the combination of a housing having a top portion and a depending skirt joined to said portion, a source of power for the mower, a vertical drive shaft operatively connected to the source of power and depending into the housing, a cutter blade fixed to the lower end of the shaft and rotated thereby in a horizontal plane within the lower portion of the housing, a solid air baffle disc fixed to the upper part of the shaft for rotation therewith in a horizontal plane wtihin the upper portion of the housing, and a perforate air impeller disc fixed to an intermediate part of the shaft for rotation by the shaft in a horizontal plane located within the housing and in spaced relation between the cutter blade and the air baffle disc.

2. The organization according to claim 1 wherein the housing top portion has an air pilot means formed therethrough.

3. The organization according to claim 1 wherein the depending skirt has a delivery opening formed therethrough.

4. The organization according to claim 3 further characterized by the fact that the delivery opening extends across and beyond the planes of rotation of the cutter blade, the impeller disc and the baffle disc.

5. In a power mower the combination of a housing having a top portion and a depending skirt joined to said portion, a source of power for the mower, a vertical drive shaft operatively connected to the source of power and depending into the housing, a narrow cutter blade fixed to the lower end of the shaft and rotated thereby in a horizontal plane within the lower portion of the housing, upwardly inclined air vanes formed on the outer, trailing edge portions on the cutter blade, a solid air baffle disc fixed to the upper part of the shaft for rotation therewith in a horizontal plane within the upper portion of the housing, and an air impeller disc fixed to an intermediate part of the shaft for rotation by the shaft in a horizontal plane located within the housing and in spaced relation between the cutter blade and the air baffle disc, said air impeller disc having an elongated, chordally extending slot formed therethrough on opposite sides of a common diameter of the disc, each of said slots being along-side of, and substantially parallel to the longitudinal axis of the cutter blade and located above the circular path of motion of the air vanes on the cutter.

6. The organization according to claim 5 wherein the slots are arranged in the disc in two pairs, the chordally extending center line of each slot in the pairs being parallel to and equally spaced from opposite sides of the common diameter of the air impeller disc, common diameters of the pairs of slots being at right angles to each other.

7. The organization according to claim 6 further characterized by the fact that the slots are positioned to lead the cutter blade during operation of the mower.

8. The organization according to claim 6 further characterized by the fact that the slots are positioned to trail the cutter blade during operation of the mower.

References Cited in the file of this patent

UNITED STATES PATENTS

| | | |
|---|---|---|
| 1,432,951 | Bell et al. | Oct. 24, 1922 |
| 2,612,017 | Jarmin | Sept. 30, 1952 |
| 2,641,100 | Sylvester | June 9, 1953 |
| 2,655,310 | Schlumbohm | Oct. 13, 1953 |
| 2,663,984 | Clark | Dec. 29, 1953 |
| 2,669,827 | Brownlee | Feb. 23, 1954 |
| 2,796,714 | Denney | June 25, 1957 |
| 2,910,223 | Schlumbohm | Oct. 27, 1959 |
| 2,917,826 | Pohr | Dec. 22, 1959 |